United States Patent [19]
Kallenbach

[11] Patent Number: 5,212,214
[45] Date of Patent: May 18, 1993

[54] ARYLENE SULFIDE COATING HAVING IMPROVED PHYSICAL PROPERTIES

[75] Inventor: Lyle R. Kallenbach, Bartlesville, Okla.

[73] Assignee: Phillips Petroleum Company, Bartlesville, Okla.

[21] Appl. No.: 696,830

[22] Filed: May 7, 1991

[51] Int. Cl.$^5$ ............................................. C08J 9/32
[52] U.S. Cl. .................................... 523/218; 523/219; 524/497; 524/609; 524/611
[58] Field of Search .................. 524/611, 497, 609; 523/218, 219

[56] References Cited

U.S. PATENT DOCUMENTS

| | | | |
|---|---|---|---|
| 3,979,543 | 9/1976 | Higbee | 428/331 |
| 4,074,010 | 2/1978 | Knight | 428/422 |
| 4,273,806 | 6/1981 | Stechler | 427/119 |
| 4,543,106 | 9/1985 | Parekh | 51/295 |
| 4,594,213 | 6/1986 | Ealer | 264/211 |
| 4,595,623 | 6/1986 | Du Pont et al. | 428/195 |
| 4,618,504 | 10/1986 | Bosna et al. | 427/34 |
| 4,618,525 | 10/1986 | Chamberlain et al. | 428/209 |
| 4,835,051 | 5/1989 | Yu et al. | 428/328 |
| 4,885,321 | 12/1989 | Nitoh | 523/218 |

OTHER PUBLICATIONS

"Technical Information on RYTON ® Polyphenylene Sulfide Resins and Compounds", Phillips Chemical Company (product guide).

"High-Performance Coatings from Poly(arylene sulfide) Resins", *Materials Performance*, vol. 27, Mar. 1988, pp. 16-18.

"High-Performance Coatings from Selected Poly(arylene sulfides) and Their Blends", L. R. Kallenbach and M. R. Lindstrom, American Chemical Society, Colorado meeting Apr. 1987.

*Primary Examiner*—Paul R. Michl
*Assistant Examiner*—U. K. Rajguru
*Attorney, Agent, or Firm*—Dougherty, Hessin, Beavers & Gilbert

[57] ABSTRACT

The present invention provides an inventive arylene sulfide coating composition which exhibits enhanced hardness, inertness, abrasion-resistance, and durability. The, inventive composition comprises an arylene sulfide polymer resin and a ceramic microsphere filler. The inventive coating composition can be applied to a substrate in order to improve the degradation resistance of the substrate and provide an article of manufacture well suited for use in high temperature, abrasive, and/or corrosive environments.

30 Claims, No Drawings

ARYLENE SULFIDE COATING HAVING IMPROVED PHYSICAL PROPERTIES

BACKGROUND OF THE INVENTION

1. Field of the Invention

In one aspect, the present invention relates to arylene sulfide polymer resin coating compositions. In another aspect, the invention relates to coating methods which utilize arylene sulfide polymer resin compositions. In yet another aspect, the invention relates to articles coated with arylene sulfide polymer resin compositions.

2. Description of the Prior Art

Arylene sulfide polymer compositions have been used to coat various kinds of substrates. Arylene sulfide coatings are generally well known for their thermal stability, chemical resistance, and ease of application. Arylene sulfide polymer coatings have been applied to substrates by slurry spraying, powder spraying, fluidized bed coating, and by other methods known in the art. An arylene sulfide polymer coating protects the underlying substrate from wear and from corrosive chemical attack.

Presently, a need exists for adherent, inert, corrosion-resistant arylene sulfide polymer coatings which possess improved hardness, abrasion resistance, and durability. Coated articles are typically subjected to abrasive forces which act to remove or wear away the coating. Removal of the coating leaves the underlying substrate exposed to corrosive chemical attack and/or abrasive wear. Rapid corrosion and/or wear of a coated article reduces the article's useful life and can increase operating costs and down time.

SUMMARY OF THE INVENTION

The present invention provides: a composition for coating a substrate; a method of improving the degradation resistance of a substrate; and an article of manufacture. The inventive coating composition comprises an arylene sulfide polymer resin and a ceramic microsphere filler. The ceramic microsphere filler is present in the inventive coating composition in an amount sufficient to improve the abrasion resistance of the composition. The method of the present invention comprises the step of depositing a layer of the inventive coating composition on at least one surface of a substrate. The article of the present invention comprises a substrate having a layer of the inventive coating composition deposited on at least one surface thereof.

Articles coated with the inventive composition are surprisingly well suited for use in high temperature, abrasive, and/or corrosive environments. The inventive coating composition possesses high thermal stability, resists chemical attack, and is easily applied. Additionally, the arylene sulfide polymer resin and the ceramic microsphere filler used in the inventive composition operate together in a synergistic manner to provide a surprisingly hard, abrasion resistant, and durable coating.

Although the cause of the above-mentioned synergistic effect is uncertain, it is believed to result from the formation of chemical bonds between the arylene sulfide polymer resin and the ceramic microspheres. The arylene sulfide polymers used in the inventive composition take up oxygen atoms when cured in an oxygen-containing environment. The ceramic microspheres used in the invention composition, on the other hand, are believed to have reactive hydroxyl groups located on the surfaces thereof. Thus, it is believed that sulfur-oxygen bonds are formed between the arylene sulfide polymer(s) and the ceramic microspheres when the inventive composition is cured.

Further objects, features, and advantages of the present invention will readily appear to those skilled in the art upon a reading of the following description of the preferred embodiments.

DESCRIPTION OF THE PREFERRED EMBODIMENTS

The Inventive Coating Composition

The inventive coating composition contains an arylene sulfide polymer resin and a ceramic microsphere filler. The arylene sulfide polymer resin used in the inventive composition is selected from: poly(arylene sulfide)(PAS); mixtures of PAS with poly(arylene sulfide/ketone)(PASK) and/or poly(arylene sulfide/sulfone) (PASS); random copolymers consisting essentially of PAS repeating units and PASK and/or PASS repeating units; block copolymers consisting essentially of PAS repeating units and PASK repeating units and/or PASS repeating units; and mixtures thereof. The inventive coating composition can also contain metal oxide and/or finely divided silica.

In one preferred embodiment, the arylene sulfide polymer resin used in the inventive composition is PAS. The PAS preferably has an extrusion rate, prior to curing, in the range of from about 80 to about 400 g per 10 minutes. Unless otherwise stated, all extrusion rates provided in this description and in the claims are determined according to ASTM D-1238, Procedure B, Automatically Timed Flow Rate Measurement, at 600° F. using a total driving mass of 345 grams and an orifice having dimensions of 0.0825±0.002 inches diameter and 1.250±0.002 inches length. Due to their ability to thoroughly wet (i.e., coat) both the ceramic microspheres incorporated therein as well as the substrate surface to which the inventive composition is applied, poly(arylene sulfides) having extrusion rates in the range of from about 120 to about 300 grams per 10 minutes are particularly well suited for use in the inventive composition. Due to their ability to thoroughly coat without dripping and/or running, poly(arylene sulfides) having extrusion rates in the range of from about 150 to about 250 grams per 10 minutes are most preferred for use in the inventive composition.

As used throughout this description and in the claims, the term "poly(arylene sulfide)" (PAS) refers to arylene sulfide homopolymers, copolymers, terpolymers, etc., or mixtures thereof, wherein: at least about 99% of the polymer repeating units are repeating units of the formula:

Ar is a divalent arylene group selected from

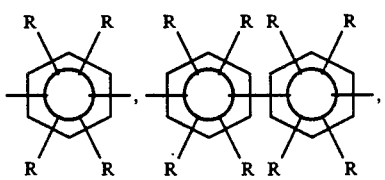

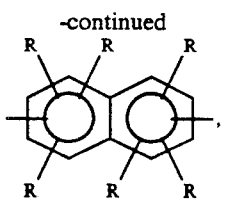

and combinations thereof; each R group is independently selected from hydrogen, alkyl, cycloalkyl, aryl and combinations thereof (e.g., alkaryl); and, in each repeating unit, the total number of carbon atoms in said R groups is in the range of from 0 to about 18. Ar is preferably phenyl.

Due to its thermal stability, chemical resistance, ease of application, availability, and low cost, the poly(arylene sulfide) preferred for use in the inventive composition is poly(p-phenylene sulfide). As used throughout this description and in the claims, the term "poly(p-phenylene sulfide)" refers to polymers and polymer mixtures in which at least about 99% of the polymer repeating units are repeating units of the formula:

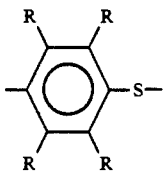

wherein each R group is independently selected from hydrogen, alkyl, cycloalkyl, aryl, and combinations thereof (e.g., alkaryl) and, in each repeating unit, the total number of carbon atoms in said R groups is in the range of from 0 to about 18. The poly(p-phenylene sulfide) most preferred for use in the inventive composition is a homopolymer composed of repeat units of the formula:

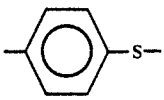

RYTON® MR11 poly(p-phenylene sulfide) resin, manufactured by Phillips Petroleum Company, is particularly well suited for use in the inventive composition.

In another preferred embodiment, the arylene sulfide polymer resin used in the inventive coating composition is a blend of high extrusion rate PAS and low extrusion rate PAS. The high extrusion rate PAS should have an extrusion rate in the range of from about 80 to about 400 g/10 min. The low extrusion rate PAS, on the other hand, should have an extrusion rate of less than about 80 g/10 min. For the reasons set forth above, the high extrusion rate PAS preferably has an extrusion rate in the range of from about 120 to about 300 g/10 min and most preferably has an extrusion rate in the range of from about 150 to about 250 g/10 min.

Preferably, the weight ratio of high extrusion rate PAS to low extrusion PAS in the PAS/PAS blend is at least about 0.2:1. PAS/PAS blends containing at least 0.2 parts by weight of high extrusion rate PAS per one part by weight of low extrusion rate PAS provide adherent, hard, corrosion-resistant coatings which are substantially free of pinhole defects.

Since low extrusion rate poly(arylene sulfides) typically cost less than high extrusion rate poly(arylene sulfides), a coating composition prepared using a high extrusion rate/low extrusion rate PAS blend can be more cost effective than a coating composition prepared using only a high extrusion rate polymer. For the reasons set forth above, the high extrusion rate/low extrusion rate PAS blend is preferably a blend of high extrusion rate poly(p-phenylene sulfide) and low extrusion rate poly(p-phenylene sulfide).

Methods for preparing poly(arylene sulfides) and poly(phenylene sulfides) suitable for use in the inventive composition are provided, for example, in U.S. Pat. No. 5 3,354,129 and U.S. Pat. No. 4,656,231, the entire disclosures of which are incorporated herein by reference.

In another preferred embodiment, the arylene sulfide polymer resin used in the inventive composition is a mixture of (a) a poly(arylene sulfide) (PAS) having an extrusion rate in the range of from about 80 to about 400 g/10 min. and (b) either a poly(arylene sulfide/ketone)(PASK), a poly(arylene sulfide/sulfone)(PASS), or a mixture of PASK and PASS. Such blends provide coatings which exhibit improved durability, adhesion, hardness, and scratch-resistance. For the reasons set forth above, the PAS used in these blends preferably has an extrusion rate in the range of from about 120 to about 300 g/10 min. Most preferably, the PAS has an extrusion rate in the range of from about 150 to about 250 g/10 min.

The PAS/PASK polymer blends used in the inventive composition should contain PAS in an amount in the range of from about 50 percent to about 99 percent by weight, based on the total weight of the polymer blend. PAS/PASK coatings which contain PAS in an amount in the range of from about 67% to about 90% by weight, based on the total weight of the polymer blend, are less likely to develop pinhole defects and are therefore preferred for use in the inventive composition. Most preferably, the PAS/PASK blend contains about 75% by weight PAS and about 25% by weight PASK.

The PAS/PASS polymer blends used in the inventive composition should contain PAS in an amount in the range of from about 75% to about 98% by weight, based on the total weight of the PAS/PASS blend. PAS/PASS coatings which contain PAS in an amount in the range of from about 85% to about 95% by weight, based on the total weight of the PAS/PASS blend, are less likely to develop pinhole defects and are therefore preferred for use in the inventive composition. Most preferably, the PAS/PASS blend contains about 90 weight percent PAS and about 10 weight percent PASS.

The PAS/PASK/PASS polymer blends used in the inventive composition preferably contain from about 70 to about 90 parts by weight PAS, from about 15 to about 5 parts by weight PASK, and from about 15 to about 5 parts by weight PASS.

As used throughout this description and in the claims, the term "poly(arylene sulfide/ketone)" (PASK) refers to homopolymers, copolymers, terpolymers, etc., and mixtures thereof, which consist essentially of polymer repeating units of the formula:

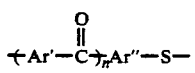

wherein: n=1 or 2 and Ar' and Ar" are independently selected from phenylene, biphenylene, naphthylene, biphenylene ether, and lower alkyl-substituted derivatives of these arylene groups. As used herein, the term "lower alkyl" refers to alkyl groups having from 1 to about 6 carbon atoms. Preferably, Ar' and Ar" are independently selected from p-phenylene and lower alkyl-substituted p-phenylene. The PASK used in the inventive composition preferably has a melt flow rate in the range of from about 100 to about 1000 g/10 min. as measured according to ASTM D-1238 at 700° F. using a 5 kg driving mass.

The PASK most preferred for use in the inventive composition is an unsubstituted poly(p-phenylene sulfide/ketone) consisting essentially of repeating units of the formula:

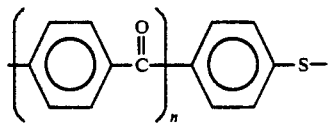

wherein n=1 or 2. Unsubstituted poly(p-phenylene sulfide/ketone) having a melt flow rate in the range of from about 100 to about 1000 g/10 min is particularly well suited for coating both the ceramic microspheres incorporated therein as well as the substrate surfaces to which the inventive composition is applied.

A method for preparing poly(arylene sulfide/ketones) and poly(phenylene sulfide/ketones) suitable for use in the inventive composition is provided, for example, in U.S. Pat. No. 4,590,104, the entire disclosure of which is incorporated herein by reference.

As used throughout this description and in the claims, the term "poly(arylene sulfide/sulfone)" (PASS) refers to homopolymers, copolymers, terpolymers, etc., and mixtures thereof, wherein at least about 99% of the polymer repeating units are repeating units of the formula:

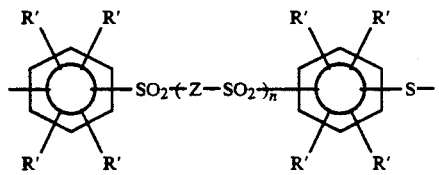

wherein Z is a divalent radical selected from

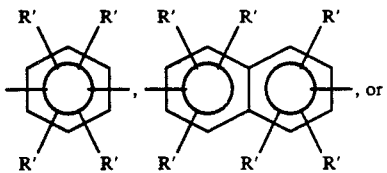

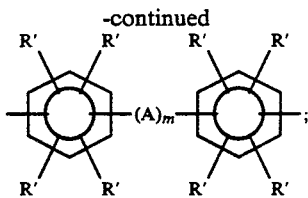

n is 0 or 1; m is 0 or 1; A is oxygen, sulfur, sulfonyl, or C(R')$_2$; each R' group is independently hydrogen or an alkyl radical having from 1 to about 4 carbon atoms; and, in each repeating unit, the total number of carbon atoms in said R' groups is in the range of from to about 12. Preferably, m=0 and n=0.

The PASS preferred for use in the inventive composition is poly(p-phenylene sulfide/sulfone). As used throughout this description and in the claims, the term "poly(p-phenylene sulfide/sulfone)" refers to polymers which consist essentially of repeating units of the formula:

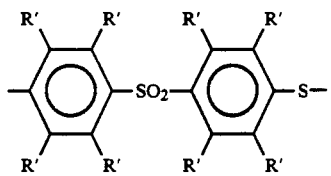

each R' is independently hydrogen or alkyl as set forth above. Most preferably, each R' is hydrogen.

The PASS used in the inventive composition preferably has a solution inherent viscosity in the range of from about 0.05 to about 0.7 dL/g. Unless otherwise stated, the solution inherent viscosities provided in this specification and in the claims are determined at 30° C. in N-methyl-2-pyrrolidone (NMP) at a polymer concentration of 0.5 grams per deciliter of NMP. Solution inherent viscosities can be determined using an Ostwald-type capillary viscometer. Solution inherent viscosity is defined as (ln $\mu_r$)/c wherein $\mu_r$ is relative viscosity (i.e., viscosity of the polymer solution/viscosity of the solvent) and c is the polymer concentration in grams per deciliter (g/dL). Poly(arylene sulfide/sulfones) having solution inherent viscosities in the range of from about 0.1 to about 0.5 dL/g are particularly well suited for use in the inventive composition.

A method for preparing poly(arylene sulfide/sulfones) and poly(phenylene sulfide/sulfones) suitable for use in the inventive composition is provided, for example, in U.S. Pat. No. 4,016,145, the entire disclosure of which is incorporated herein by reference.

The PAS/PAS, PAS/PASK, PAS/PASS, and PAS/PASK/PASS polymer blends described above can be prepared using conventional methods known in the art. For example, the individual polymer components can be combined with the other components of the inventive coating composition and the entire coating composition can be mixed by ball milling or by other means known in the art.

In another preferred embodiment, the arylene sulfide polymer resin used in the inventive composition comprises a random copolymer which consists essentially of PAS repeating units and PASK repeating units and/or PASS repeating units. The PAS, PASK, and PASS repeating units of these random copolymers are identical to the respective PAS polymer, PASK polymer, and PASS polymer repeating units described hereinabove. The random copolymers preferably contain PAS and PASK and/or PASS repeating units in the same relative amounts as set forth above for mixtures of PAS and PASK and/or PASS. Random copolymers having solution inherent viscosities in the range of from about 0.1 to about 0.7 dL/g are well suited for use in the inventive composition. Random copolymers having solution inherent viscosities in the range of from about 0.1 to about 0.2 dL/g are particularly well suited for use in the inventive composition.

The random copolymers most preferred for use in the inventive composition are random copolymers which consist essentially of (a) poly(p-phenylene sulfide) repeating units and (b) poly(p-phenylene sulfide/ketone) repeating units and/or poly(p-phenylene sulfide/sulfone) repeating units. A method for preparing random copolymers suitable for use in the inventive composition is provided, for example, in U.S. Pat. No. 3,354,129, the entire disclosure of which has been incorporated herein by reference.

In another preferred embodiment, the arylene sulfide polymer resin used in the inventive composition is a block copolymer resin consisting essentially of: PAS polymer segments; random PAS copolymer segments; PASK polymer segments; and/or PASS polymer segments. The repeating units of these polymer segments are identical to the repeating units of the respective PAS polymers, PAS random copolymers, PASK polymers, and PASS polymers described above. The block copolymers used in the inventive composition preferably contain PAS and PASK and/or PASS repeating units in the same relative amounts as described above for mixtures of PAS and PASK and/or PASS. Block copolymers having solution inherent viscosities in the range of from about 0.05 to about 0.7 dL/g are well suited for use in the inventive composition. Block copolymers having solution inherent viscosities in the range of from about 0.1 to about 0.2 dL/g are particularly well suited for use in the inventive composition. A method for preparing block copolymers suitable for use in the inventive composition is provided, for example, in U.S. Pat. No. 4,734,470, the entire disclosure of which is incorporated herein by reference.

The polymer components used in the inventive coating composition preferably have particles sizes in the range of from about 10 microns to about 250 microns. Most preferably, the polymer components of the inventive composition have particle sizes in the range of from about 100 microns to about 200 microns. Polymer components having particle sizes in the range of from about 100 to about 200 microns provide enhanced coating smoothness, are readily available, and are easily handled. The particle sizes of the polymeric components can be reduced, as necessary, by grinding, air milling, ball milling, or by other techniques known in the art. If desired, the particle size of the polymer components can be reduced while the ingredients of the inventive coating composition are being mixed. For example, the ingredients of the inventive coating composition can be combined and then ball milled in order to achieve both ingredient mixing and polymer particle size reduction.

The ceramic microsphere filler used in the inventive coating composition is preferably composed of hollow, spherically-shaped ceramic particles. The spherically-shaped ceramic particles are typically composed of from about 45 parts to about 60 parts by weight silica ($SiO_2$), from about 25 parts to about 38 parts by weight of alumina ($Al_2O_3$), and up to about ten parts by weight ferric oxide ($Fe_2O_3$). The ceramic microsphere filler should have a particle size of less than about 325 mesh. In order to further enhance the crush resistance and scratch resistance of the inventive coating composition, it is preferred that the ceramic microsphere filler have a compressive strength of at least about 4000 psi and a Moh's scale hardness of at least about 5. A method for producing a hollow ceramic microsphere filler suitable for use in the inventive composition is described, for example, in U.S. Pat. No. 4,115,256, the entire disclosure of which is incorporated herein by reference.

Examples of commercially available ceramic microsphere fillers suitable for use in the inventive composition include EXTENDOSPHERES ®, manufactured by P.A. Industries, Inc., and ZEEOSPHERES ®, manufactured by Zeelan Industries, Inc. EXTENDOSPHERES ® are described in the brochure entitled "EXTENDOSPHERES ® BUBBLEKUP ®: Surface Modified Hollow Microspheres", distributed by P.A. Industries, Inc., Post Office Box 2370, Chattanooga, Tn. 37409, the entire disclosure of which is incorporated herein by reference. EXTENDOSPHERES ® have a compressive strength of 4,000 psi, a Moh's scale hardness of 5, a melting point of 1,200° C., a bulk density of 25 lbs/ft$^3$ and a shell thickness of about ten percent of diameter. ZEEOSPHERES ® are described in the brochure entitled "What to Expect When You Include ZEEOSPERES ® in Your Paints and Coatings", distributed by Zeeland Industries, Inc., 320 Endicott Building, St. Paul, Mn. 55101, the entire disclosure of which is incorporated herein by reference. ZEEOSPHERES ® have a compressive strength of over 60,000 psi, a Moh's scale hardness of 7, a softening point of 1,200° C., and a specific gravity of between 2.0 and 2.3 g/cc.

The ceramic microsphere filler is present in the inventive coating composition in an amount sufficient to improve the abrasion resistance of the coating composition. The inventive coating composition preferably contains from about 50 to about 85 parts by weight of a suitable arylene sulfide polymer resin, as described above, and from about 15 parts to about 40 parts by weight ceramic microsphere filler. Optimum abrasion resistance and coating adhesion are obtained when the inventive coating composition contains from about 55 parts to about 80 parts by weight arylene sulfide polymer resin and from about 20 parts to about 30 parts by weight ceramic microsphere filler.

The inventive coating composition can also contain one or more metal oxides. Metal oxides enhance the adhesiveness, hardness, and corrosion resistance of the inventive coating composition. Examples of suitable metal oxides include titanium dioxide ($TiO_2$), zirconium dioxide ($ZrO_2$), hafnium dioxide ($HfO_2$), and mixtures of these metal oxides. Preferably, the metal oxide is in powder form and has a specific gravity, based on the density of water, in the range of from about 3.8 to about 10.0. When used, metal oxide is preferably present in the inventive composition in an amount in the range of from about 15 parts to about 25 parts by weight, given from about 50 to about 85 parts by weight of arylene sulfide polymer resin and from about 15 to about 40 parts by weight of ceramic microsphere filler.

Due to their chemical inertness and pigmentary characteristics, the metal oxides preferred for use in the inventive composition are titanium dioxide and zirconium dioxide. Because of its availability and low cost, titanium dioxide is presently the metal oxide most preferred for use in the inventive composition.

The Inventive Method

In the method of the present invention, a layer of the inventive coating composition described above is deposited on at least one surface of a substrate in order to improve the degradation resistance of the substrate. The inventive composition can be deposited on the substrate surface using conventional methods known in the art. Examples of such methods include electrostatic spraying, powder spraying, fluidized bed coating, slurry spraying, etc.

Prior to deposition of the inventive coating composition, the substrate surface should be cleaned. Examples of suitable cleaning methods known in the art include solvent washing, vapor degreasing, sonic degreasing, thermal degradation, etc. If a roughening procedure (e.g., grit blasting, chemical etching, etc.) is used, the substrate surface should be cleaned after the roughening procedure has been completed. Surface roughening provides improved coating adhesion.

Substrates suitable for use in the inventive method can be formed from any metal, glass, ceramic, or other material to which the inventive coating composition will adhere and which can withstand the temperature conditions required for curing the polymer component(s) of the inventive coating composition. As explained hereinbelow, the polymer components of the inventive composition are typically cured at a temperature in the range of from about 315° C. to about 470° C. Examples of suitable substrate materials include iron, iron-containing alloys (e.g., steel), magnesium-containing alloys, aluminum, titanium, copper, glass, ceramics, porcelain, and alloys such as nickel, bronze, etc. Examples of suitable iron-containing alloys include steels, such as low, medium, and high carbon steel, and various stainless steels, such as martensitic, ferritic, and austenitic stainless steel.

In order to form a powdered coating composition suitable for use in a powdered composition coating method, e.g., electrostatic spraying, powder spraying, etc., the components of the inventive composition can be dry mixed using conventional solids-blending equipment. (e.g., a cone screw blender, a paddle blender, a cone blender, a rotary batch or twin shell vee blender, etc.). Grinding or ball milling can be employed as necessary during or after the mixing of the coating composition components in order to obtain a suitable polymer particle size.

If an electrostatic spraying method is used, the powdered coating composition can be applied to a cold substrate surface (i.e., approximately ambient temperature) or to a hot substrate surface (i.e., a substrate surface heated to a temperature of up to about 470° C). Improved coating adhesion can be achieved by preheating the substrate surface to a temperature in the range of from about 350° C. to about 470° C. prior to applying the powdered coating composition.

When an electrostatic spraying method is used, finely divided silica ($SiO_2$), e.g., fumed silica, can optionally be included in the inventive coating composition in an amount in the range of from about 0.1 parts to about 1.5 parts by weight, given from about 50 to about 85 parts by weight of arylene sulfide polymer resin and from about 15 to about 40 parts by weight of ceramic microsphere filler. The presence of silica in the powdered coating composition improves the dispersion of the dry powder in the electrostatic spray.

If the inventive coating composition is applied using a slurry spraying method, a suitable slurry can be prepared by adding a liquid carrier to the inventive coating composition. The liquid carrier can generally be any inert diluent which is normally liquid at room temperature and will vaporize prior to or during the heating and/or curing of the applied coating. Examples of suitable liquid carriers include 1,2-propanediol (propylene glycol), 1,3-propanediol, 1,2-butanediol, 1,4-butanediol, like compounds and mixtures thereof.

When a slurry spraying method is used, the slurry coating composition can be applied to a cold substrate surface (i.e., approximately ambient temperature) or to a hot substrate surface (i.e., a substrate surface preheated to a temperature of up to about 470° C.). In order to obtain improved coating adhesion, the substrate surface is preferably preheated to a temperature in the range of from about 350° C. to about 470° C. prior to application of the slurry coating composition.

After a layer of the inventive coating composition has been deposited on the substrate surface, the coating composition is heated in order to cure the polymer components of the coating composition. The arylene sulfide polymer resins used in the inventive composition are typically cured by heating the layer of coating to a temperature in the range of from about 315° C. to about 470° C. Depending upon the temperature used, the polymer components of the inventive composition will typically cure in a time period in the range of from about 0.25 hours to about 24 hours.

A layer of coating composition deposited by electrostatic spraying or by slurry spraying will typically have a thickness, after curing, in the range of from about 0.5 to about 1.0 mil. The coating and curing steps described above can be repeated as many times as necessary in order to obtain a desired coating thickness.

If the substrate is composed of an iron-containing alloy, improved coating adhesion can be achieved by aging the substrate at an elevated temperature prior to deposition of the inventive coating composition. Sufficient aging can be achieved by preheating the substrate in an atmosphere comprising oxygen and water vapor (e.g., air) to a temperature in the range of from about 350° C. to about 470° C. and maintaining the preheated temperature for a period of at least about 0.5 hours.

The Inventive Article of Manufacture

The present invention provides an article of manufacture comprising (a) a suitable substrate, as described above, having at least one surface and (b) a layer of the inventive coating composition deposited on the surface. The inventive article of manufacture can be produced by the inventive method described above. Coated conveyor belts, coated floor coverings for use in chemical plants, coated sucker rods, and other coated articles used for well drilling and fluid production are examples of useful articles provided by the present invention.

The following example is provided in order to further illustrate the present invention.

EXAMPLE

Four test compositions comprising poly(arylene sulfide) and a ceramic microsphere filler were tested against five poly(arylene sulfide) coating compositions containing no ceramic microsphere filler. Each of the nine test compositions was applied to a separate test coupon and examined to determine coating thickness, coating hardness, the prevalence of pinhole defects, and coating adhesion. As discussed below, the test compositions comprising poly(arylene sulfide) and a ceramic microsphere filler exhibited improved hardness and excellent adhesion. Additionally, the test coatings comprising poly(arylene sulfide) and ceramic microsphere filler had no pinhole defects.

As shown in Table I, nine poly(p-phenylene sulfide) (PPS) slurry coating compositions were prepared for testing. The PPS resin used in these compositions was RYTON® MR11 manufactured by Phillips Petroleum Company. The PPS resin had an extrusion rate, prior to curing, of about 229 g per 10 min. The PPS resin was ground in a Raymond Mill and sieved so that the resin passed a 60 mesh screen.

As also seen in Table I, the nine test compositions contained varying amounts of fumed silica, titanium dioxide, zirconium dioxide and liquid carrier. The liquid carrier used in preparing these slurries was propylene glycol. Each slurry composition was prepared by mixing all of its components in a Waring Blender® for approximately 15 minutes.

Slurry compositions 4 and 5 each contained ZEEOSPHERES® in a concentration of 19.3% by weight, based on the total dry weight of the composition. Slurry compositions 8 and 9 each contained EXTENDOSPHERES® in a concentration of 24.7% by weight, based on the total dry weight of the composition. The ZEEOSPHERES® and EXTENDOSPHERES® used in slurry compositions 4, 5, 8, and 9 had particle sizes of less than 325 mesh.

Each test composition was applied to a separate 20 gauge steel test coupon. The steel test coupons were about 40 mils thick and had dimensions of six inches length and three inches width. Each coupon received three coats of one of the nine test compositions. The test compositions were applied using a coating rod. After each coat of test composition was applied, the coat was cured at 371° C. for about 30 minutes. After receiving three coats of test composition, each test coupon was annealed for two hours at 232° C.

Coating thickness was determined according to ASTM D-1186 using the magnetic flux technique. This method employs a calibrated thickness gauge which measures changes in magnetic flux as the flux passes through coatings of varying thickness. Films of known thickness were used to calibrate the equipment. Ten measurements were made randomly along the length and circumference of each coupon and the average thickness was calculated.

Coating hardness was determined according to the ASTM D-3363 Pencil Hardness Test. In conducting this test, an operator attempts to rupture or scratch the coating with pencils of varying lead hardness. The pencil hardness of the coating is established by the hardest pencil which will neither rupture nor scratch the coating. As shown in Table II, there are ten possible pencil hardness letter designations. Numerical hardness ratings corresponding to these letter designations are also provided in Table II.

The number of pinhole defects, or holidays, present in each coating was measured using a Simpson Model 400-2 insulation tester. The insulation tester was operated in the 2–200 megohm range with a wet sponge probe. Each coupon was marked off into one inch linear sections and the probe was pushed down the coupon. A count was made of the number of meter deflections observed per each one inch coupon section. Meter deflections result from current flow; thus, each meter deflection indicates a pinhole defect, or holiday, in the coating.

In order to test coating adhesion, an X-shaped groove was cut through each coating using a No. 22 X-acto® knife. The knife was then inserted into the groove and the coating was pried from the surface. Ratings of 1 through 5 were given with 5 being the best adhesion rating. A rating of 5 was given if the coating broke within itself but could not be lifted entirely from the surface. A rating of 4 was given if small areas of metal were visible but over 50 percent of the coating remained. A rating of 3 was given if a small amount of coating remained but over 50 percent of the coating was removed. A rating of 2 was given if all of the coating was removed. A rating of 1 was given if the coating debonded without the use of a knife.

As seen by comparing the results obtained for test compositions 1, 2, 3, 4, and 5, the incorporation of ZEEOSPHERES® and titanium oxide improved the pencil hardness of test compositions 4 and 5 from a letter designation of F to letter designations of 2H and 3H. As seen in Table II, these letter designation improvements are equivalent to numerical hardness rating improvements of 2 points and 3 points.

As seen by comparing the results obtained for test compositions 1, 2, 3, 8, and 9, the incorporation of EXTENDOSPHERES® improved the pencil hardness of test compositions 8 and 9 from a letter designation of F to a letter designation of 9H. As seen in Table II, this letter designation improvement corresponds to a numerical hardness improvement of 9 points.

As also seen in Table I, the test compositions containing ceramic microsphere filler performed well in all areas tested. In addition to improved hardness, the coating compositions containing ceramic microsphere filler exhibited excellent adhesion characteristics and were free of pinhole defects. The superior hardness and adhesion exhibited by the test compositions containing ceramic microsphere filler provides an excellent indication of the improved abrasion resistance achieved in these compositions.

TABLE I

| | COATING FORMULATIONS AND RESULTS | | | | | | | | |
|---|---|---|---|---|---|---|---|---|---|
| | TEST COMPOSITION | | | | | | | | |
| | 1 | 2 | 3 | 4 | 5 | 6 | 7 | 8 | 9 |
| COMPONENTS grams (dry %) | | | | | | | | | |
| PPS[1] | 12 (97.6) | 12 (97.6) | 12 (97.6) | 18.7 (60.1) | 18.7 (60.1) | 12 (74.1) | 12 (74.1) | 12 (74.1) | 12 (74.1) |
| Fumed Silica[2] | 0.3 (2.4) | 0.3 (2.4) | 0.3 (2.4) | 0.2 (0.6) | 0.2 (0.6) | 0.2 (1.2) | 0.2 (1.2) | 0.2 (1.2) | 0.2 (1.2) |
| Propylene Glycol | 22 | 22 | 22 | 34.9 | 34.9 | 22 | 22 | 22 | 22 |
| ZEEOSPHERES ®[3] | — | — | — | 6.0 | 6.0 | — | — | — | — |

TABLE I-continued

| COATING FORMULATIONS AND RESULTS | | | | | | | | | |
|---|---|---|---|---|---|---|---|---|---|
| | TEST COMPOSITION | | | | | | | | |
| | 1 | 2 | 3 | 4 | 5 | 6 | 7 | 8 | 9 |
| EXTENDOSPHERES ®[(4)] | — | — | — | (19.3) — | (19.3) — | — | — | 4 (24.7) | 4 (24.7) |
| $TiO_2$ | — | — | — | 6.2 (19.9) | 6.2 (19.9) | 4 (24.7) | — | — | — |
| $ZrO_2$ | — | — | — | — | — | — | 4 (24.7) | — | — |
| TEST RESULTS | | | | | | | | | |
| Coating Thickness (mils)[(5)] | 3.2 | 3.4 | 3.1 | 4.3 | 4.2 | 4.0 | 3.6 | 4.4 | 4.5 |
| Pencil Hardness[(6)] | F | F | F | 2H | 3H | 4H | 4H | 9H | 9H |
| Holidays[(7)] | 0 | 0 | 0 | 0 | 0 | 0 | 0 | 0 | 0 |
| Adhesion[(8)] | 4 | 4 | 4 | 4 | 4 | 5 | 5 | 4 | 5 |

[(1)]Ryton ® MR11 manufactured by Phillips Petroleum Co.
[(2)]Degussa AEROSIL ® 200.
[(3)]Ceramic microsphere filler manufactured by Zeelan Industries, Inc.
[(4)]Ceramic microsphere filler manufactured by P.A. Industries, Inc.
[(5)]ASTM D-1186 using the magnetic flux technique.
[(6)]ASTM D-3363 Pencil hardness test.
[(7)]Determined using a Simpson Model 400-2 insulation tester operating in the 2-200 megohm range and utilizing a wet sponge probe. The number of holidays per coupon was estimated by the number of meter deflections observed.
[(8)]Possible ratings range from 1 to 5 with 5 being the best. The method used for determining adhesion is described above.

TABLE II

| PENCIL HARDNESS | |
|---|---|
| Letter | Numerical Rating |
| F | 1 |
| H | 2 |
| 2H | 3 |
| 3H | 4 |
| 4H | 5 |
| 5H | 6 |
| 6H | 7 |
| 7H | 8 |
| 8H | 9 |
| 9H | 10 |

Thus, the present invention is well adapted to carry out the objects and attain the ends and advantages mentioned above as well as those inherent therein. While presently preferred embodiments have been described for purposes of this disclosure, numerous changes will be apparent to those skilled in the art. Such changes are encompassed within the spirit of this invention as defined by the appended claims.

What is claimed is:

1. A method of improving the degradation resistance of a substrate comprising the step of coating at least one surface of said substrate with a layer of an arylene sulfide polymer coating composition, said arylene sulfide polymer coating composition comprising an arylene sulfide polymer coating resin and a ceramic microsphere filler incorporated in said arylene sulfide polymer resin, said ceramic microsphere filler being present in said coating composition in an amount in the range of from about 15 to about 40 parts by weight and said arylene sulfide polymer resin being present in said coating composition in an amount in the range of from about 50 to about 85 parts by weight such that said ceramic microsphere filler operates to improve the abrasion resistance of said coating composition.

2. The method of claim 1 wherein said arylene sulfide polymer resin is selected from: poly(arylene sulfide); a mixture of poly(arylene sulfide) and poly(arylene sulfide/ketone), poly(arylene sulfide/sulfone), or poly(arylene sulfide/ketone) and poly(arylene sulfide/sulfone); random copolymers consisting essentially of poly(arylene sulfide) repeating units and poly(arylene sulfide/ketone) repeating units, poly(arylene sulfide/sulfone) repeating units, or poly(arylene sulfide/ketone) and poly(arylene sulfide/sulfone) repeating units; block copolymers consisting essentially of poly(arylene sulfide) repeating units and poly(arylene sulfide/ketone) repeating units, poly(arylene sulfide/sulfone) repeating units, or poly(arylene sulfide/ketone) and poly(arylene sulfide/sulfone) repeating units; or mixtures thereof.

3. The method of claim 2 wherein said ceramic microsphere filler has a compressive strength of at least about 4000 psi.

4. The method of claim 2 wherein said arylene sulfide polymer resin is poly(arylene sulfide).

5. The method of claim 4 wherein said poly(arylene sulfide) comprises a high extrusion rate poly(arylene sulfide) having an extrusion rate, prior to curing, in the range of from about 80 to about 400 grams per ten minutes.

6. The method of claim 5 wherein said high extrusion rate poly(arylene sulfide) is poly(p-phenylene sulfide).

7. The method of claim 6 wherein said poly(arylene sulfide) further comprises a low extrusion rate poly(arylene sulfide) having an extrusion rate, prior to curing, of less than about 80 g/10 minutes.

8. The method of claim 7 wherein said low extrusion rate poly(arylene sulfide) is poly(p-phenylene sulfide).

9. The method of claim 8 wherein the weight ratio of said high extrusion rate poly(arylene sulfide) to said low extrusion rate poly(arylene sulfide) is at least about 0.2:1.

10. The method of claim 2 wherein said arylene sulfide polymer resin is said mixture of poly(arylene sulfide) and poly(arylene sulfide/ ketone), poly(arylene sulfide/sulfone), or poly(arylene sulfide/ketone) and poly(arylene sulfide/sulfone).

11. The method of claim 10 wherein said poly(arylene sulfide) is poly(p-phenylene sulfide), said poly(arylene sulfide/ketone) is poly(p-phenylene sulfide/ketone), and said poly(arylene sulfide/sulfone) is poly(p-phenylene sulfide/sulfone).

12. The method of claim 2 wherein said coating composition further comprises a metal oxide selected from titanium dioxide, zirconium dioxide, hafnium dioxide, or mixtures thereof.

13. A coated substrate prepared in accordance with the method of claim 2.

14. An article of manufacture comprising:
a substrate having at least one surface; and
a layer of an arylene sulfide polymer coating composition coated on said surface, said arylene sulfide polymer coating composition comprising an arylene sulfide polymer coating resin and a ceramic microsphere filler incorporated in said arylene sulfide polymer resin, said ceramic microsphere filler being present in said coating composition in an amount in the range of from about 15 to about 40 parts by weight and said arylene sulfide polymer resin being present in said coating composition in an amount in the range of from about 50 to about 85 parts by weight such that said ceramic microsphere filler operates to improve the abrasion resistance of said coating composition.

15. The article of claim 14 wherein said arylene sulfide polymer resin is selected from: poly(arylene sulfide); a mixture of poly(arylene sulfide) and poly(arylene sulfide/ketone), poly(arylene sulfide/sulfone), or poly(arylene sulfide/ketone) and poly(arylene sulfide/sulfone); random copolymers consisting essentially of poly(arylene sulfide) repeating units and poly(arylene sulfide/ketone) repeating units, poly(arylene sulfide/sulfone) repeating units, or poly(arylene sulfide/ketone) and poly(arylene sulfide/sulfone) repeating units; block copolymers consisting essentially of poly(arylene sulfide) repeating units and poly(arylene sulfide/ketone) repeating units, poly(arylene sulfide/sulfone) repeating units, or poly(arylene sulfide/ketone) and poly(arylene sulfide/sulfone) repeating units; or mixtures thereof.

16. The article of claim 15 wherein said arylene sulfide polymer resin is poly(arylene sulfide).

17. The article of claim 16 wherein said poly(arylene sulfide) comprises a high extrusion rate poly(arylene sulfide) having an extrusion rate, prior to curing, in the range of from about 80 to about 400 grams per ten minutes.

18. The article of claim 17 wherein said poly(arylene sulfide) further comprises a low extrusion rate poly(arylene sulfide) having an extrusion rate, prior to curing, of less than about 80 g/10 minutes.

19. The article of claim 18 wherein both said high extrusion rate poly(arylene sulfide) and said low extrusion rate poly(arylene sulfide) are poly(p-phenylene sulfide).

20. The article of claim 15 wherein said arylene sulfide polymer resin is said mixture of poly(arylene sulfide) and poly(arylene sulfide/ketone), poly(arylene sulfide/sulfone), or poly(arylene sulfide/ketone) and poly(arylene sulfide/sulfone).

21. The article of claim 20 wherein said poly(arylene sulfide) is poly(p-phenylene sulfide), said poly(arylene sulfide/ketone) is poly(p-phenylene sulfide/ketone) and said poly(arylene sulfide/sulfone) is poly(p-phenylene sulfide/sulfone).

22. The article of claim 15 wherein said coating composition further comprises a metal oxide selected from titanium dioxide, zirconium dioxide, hafnium oxide, or mixtures thereof.

23. The method of claim 2 wherein said surface of said substrate is coated with said arylene sulfide polymer coating composition in accordance with said step of coating by electrostatic spraying.

24. The method of claim 23 further comprising the step, prior to said step of coating, of preheating said surface of said substrate to a temperature in the range of from about 350° C. to about 470° C.

25. The method of claim 2 wherein said surface of said substrate is coated with said arylene sulfide polymer coating composition in accordance with said step of coating by powder spraying.

26. The method of claim 2 wherein said surface of said substrate is coated with said arylene sulfide polymer coating composition in accordance with said step of coating by slurry spraying.

27. The method of claim 26 further comprising the step, prior to said step of coating, of preheating said surface of said substrate to a temperature in the range of from about 350° C. to about 470° C.

28. The method of claim 2 wherein said surface of said substrate is coated with said arylene sulfide polymer coating composition in accordance with said step of coating by fluidized bed coating.

29. The method of claim 2 wherein said surface of said substrate is coated with said arylene sulfide polymer coating composition in accordance with said step of coating using a coating rod.

30. The method of claim 2 wherein said substrate comprises an iron-containing alloy and wherein, prior to said step of coating, said surface of said substrate is aged by maintaining said surface of said substrate in an atmosphere comprising oxygen and water vapor at a temperature in the range of from about 350° C. to about 470° C. for a period of at least about 0.5 hours.

* * * * *

UNITED STATES PATENT AND TRADEMARK OFFICE
CERTIFICATE OF CORRECTION

PATENT NO. : 5,212,214
DATED : May 18, 1993
INVENTOR(S) : Lyle R. Kallenbach

It is certified that error appears in the above-identified patent and that said Letters Patent is hereby corrected as shown below:

Col. 4, lines 16-17, change "U.S. Pat. No. 5 3,354,129" to --U.S. Pat. No. 3,354,129--.

Signed and Sealed this

Twenty-second Day of February, 1994

Attest:

BRUCE LEHMAN

Attesting Officer

Commissioner of Patents and Trademarks